United States Patent
Anderson et al.

(10) Patent No.: US 10,041,642 B2
(45) Date of Patent: Aug. 7, 2018

(54) LASER BASED VISUAL EFFECT DEVICE AND SYSTEM

(71) Applicants: Timothy Lee Anderson, Folsom, CA (US); Tamas Kovacs, Kiskoros (HU)

(72) Inventors: Timothy Lee Anderson, Folsom, CA (US); Tamas Kovacs, Kiskoros (HU)

( * ) Notice: Subject to any disclaimer, the term of this patent is extended or adjusted under 35 U.S.C. 154(b) by 24 days.

(21) Appl. No.: 15/425,691

(22) Filed: Feb. 6, 2017

(65) Prior Publication Data

US 2017/0227180 A1 Aug. 10, 2017

Related U.S. Application Data

(60) Provisional application No. 62/291,597, filed on Feb. 5, 2016.

(51) Int. Cl.

| | |
|---|---|
| *F21V 14/00* | (2018.01) |
| *F21S 10/02* | (2006.01) |
| *G03B 21/20* | (2006.01) |
| *G03B 21/14* | (2006.01) |
| *F21V 14/02* | (2006.01) |
| *G03B 21/16* | (2006.01) |
| *F21Y 113/13* | (2016.01) |

(Continued)

(52) U.S. Cl.
CPC ............ *F21S 10/023* (2013.01); *F21V 14/02* (2013.01); *G03B 21/145* (2013.01); *G03B 21/2013* (2013.01); *G03B 21/2033* (2013.01); *G03B 21/2093* (2013.01); *F21V 29/56* (2015.01); *F21Y 2105/10* (2016.08); *F21Y 2113/13* (2016.08); *G03B 21/16* (2013.01)

(58) Field of Classification Search
CPC ........ F21S 10/023; F21V 14/02; F21V 29/56; G03B 21/145; G03B 21/16; G03B 21/2013; G03B 21/2033; G03B 21/2093; F21Y 2113/20
See application file for complete search history.

(56) References Cited

U.S. PATENT DOCUMENTS 9,341,928 B2 * 5/2016 Kase .................... G03B 21/142
                                                        353/84
9,869,459 B2 * 1/2018 Lentine ............... F21V 21/0824
                                                        362/152

(Continued)

*Primary Examiner* — Peggy Neils
(74) *Attorney, Agent, or Firm* — Gary L. Eastman, Esq.; Eastman & McCartney LLP

(57) ABSTRACT

Disclosed is a laser-based device for use primarily for laser light effects. The laser device comprises multiple red, green, and blue lasers. Each laser has a lens to collimate and focus each individual beam. The lasers are aligned such that each laser shares a common output axis. The intensity of each laser is adjustable thereby allowing the overall output color of the device to change. The overall output has over 16 million colors. Each laser-based device has a gimbal-like system to allow the devices change theft orientation. A remote control system allows for the control and synchronization of multiple devices. Multiple devices may connect to the remote control system using cables, wireless transceivers, or both. Multiple devices may be located in close proximity to create a more powerful overall output beam. The remote control system allows for viewer interaction through an application installed onto a personal communication device.

1 Claim, 12 Drawing Sheets

(51) Int. Cl.
*F21V 29/56* (2015.01)
*F21Y 105/10* (2016.01)

(56) References Cited

U.S. PATENT DOCUMENTS

2016/0006996 A1* 1/2016 Mukai et al. .......... H04N 9/141
                                                    353/119
2016/0231576 A1* 8/2016 Jurik et al. ........... G03B 27/141
                                                    362/228

* cited by examiner

LASER BASED VISUAL EFFECT DEVICE AND SYSTEM

RELATED APPLICATIONS

This application claims the benefit of priority to the United States Provisional Patent Application for "Lase Based Visual Effect Device and System," Ser. No. 62/291,597 filed on Feb. 5, 2016, and currently co-pending.

FIELD OF THE INVENTION

The present invention pertains generally to a display projection device for use in entertainment. More particularly, the present invention pertains to a laser based device for projecting a collimated laser consisting of a grouping of smaller laser devices. The Present invention is particularly, but not exclusively, useful as a device for projecting a large laser beam for use during an entertainment event or as a location identifier.

BACKGROUND OF THE INVENTION

For almost as long a visible-wavelength lasers have existed, artists have been inspired to create stunning visual displays. These visual displays vary from multicolor forms and images projected onto a surface to large columns of light. Some implementations project a series of forms and images to create the illusion that the form or image moves. Many artistic implementations use a combination of static and moving forms and images as well as light columns to create their artistic vision.

Laser shows typically rely on stationary lasers pointed toward moving mirrors. As the mirrors move, the laser beams reflect off the mirror's surface and project to a specific location or in a specific direction. Various types of mirror movement are used to project an image, which is typically referred to as "scanning". In conjunction with "scanning", Laser systems may also use "chopping", which is the blocking of a laser beam thereby creating a blank spot in a projected image or form, and "blanking", which creates blank spots in a projected image or form by rapidly turn the laser on and off. "Chopping" and "blanking" separate line segments, curves, letters, and numbers.

Laser may also be used to create "atmospheric" or beam effects, in which an audience sees the laser beam as it moves through the air. This effect is due to Rayleigh scattering, which is the scattering of light, or other electromagnetic radiation, off small molecules in the air. Rayleigh scattering is the reason the Earth's sky is blue and the Sun has a yellow tone when viewed from inside Earth's atmosphere.

To understand the nature of laser light shows, one needs to have a basic understanding of lasers. "Laser" is short for Light Amplification by Stimulated Emission of Radiation. The concept of a laser dates back to the late 1800s. In the early 1900s, Einstein proffered the theoretical physics behind the operation of a laser. The first laser was put into operation in 1960. Basically, a laser works when a light photon interacts with an electron thereby causing the electron to jump to a higher energy state. If another light photon "hits" the high-energy electron, the electron returns to its original low energy state by emitting two photons of the same wavelength. By repeating this process often enough, a laser produces organized, or coherent, photons, which then exit the laser in a column, or laser beam.

Laser light is different from daylight or electric light in that a laser emits only one wavelength, or color, of light. Daylight or electric lights generally consist of many wavelengths, where daylight generally contains every color in the visible spectrum. The light that comes from a laser is highly organized since a laser launches one wave at a time and in the same direction as the previous wave.

Dispersion and blooming are common effects on laser beams. Blooming is where a laser beam defocuses and disperses energy into the surrounding air. Blooming can be more severe if there is fog, smoke, or dust in the air. Due to the use of fog and smoke machines during a light show, it is common for a laser-based display to exhibit some dispersion effects.

Over time since its first production, lasers have been used for any different purposes. Laser surgery is now commonplace, where lasers are used to cut tissue or perform other medical procedures. Other uses of lasers include welding, scanning, and etching. Other implementations include weaponized lasers, where the lasers are used to indicate a target for the delivery of ordinance, or where the laser itself provides the destructive effect.

Modern laser light shows incorporate different lasers to gain different visual effects. Most lasers are narrow beam and are used to create images and simulated movement of those images. In conjunction with small lasers, larger lasers are used to add effect to the light show. These lasers are capable of outputting a single color beam. However, based on laser size limitations, the width of the beam, and the distance it travels before fading, is limited. What is needed in the industry is a large laser device capable of outputting a wide beam capable of projecting long distances and of producing multiple colors.

SUMMARY OF THE INVENTION

An object of the present invention is to produce a wide laser beam that has low dispersion and is capable of projecting a long distance, such as for 1000 or more feet. The laser beam is capable of transmission over a long distance with only a minimal amount of dispersion. The system of the present invention utilizes an array of lasers mounted coaxially in a base unit. Each individual laser is focused and aligned to create a beam capable of long distance transmission. In a preferred embodiment, the base unit comprises an array of red, green, and blue lasers. Each laser is capable of varying intensity. Since the beams are parallel with minimal dispersion, different colors may be achieved by varying the intensity of one or more colors to achieve a specific color. In a preferred embodiment, the laser sky cannon is capable of displaying over 16 million colors.

Other embodiments of the present invention have the laser base unit mounted on a gimbal-like support to allow the LSC the ability to point in different directions. Some laser show venues may require that the LSC does not move from its initial position due to local rules and regulations, such as the Federal Aviation Administration's rules covering commercial flights. However, with proper planning, some venues may allow the LSC to move and point in different directions, where the LSC may not be allowed to point in a designated direction for safety concerns.

Yet other embodiments of the present invention have the LSC part of a display and control system. The display and control system may be associated with a central control system. The central control system allows the LSC to move in preset patterns where the lasers may be varied in intensity and color during movement. Other implementations allow for viewers in a venue to use a mobile application on an electronic device to control the LSC. Other functions allow the venue attendees to submit a message to the central control system, which in turn modulates the laser beam using a Morse code format, thereby communicating the message into earth orbit and beyond.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
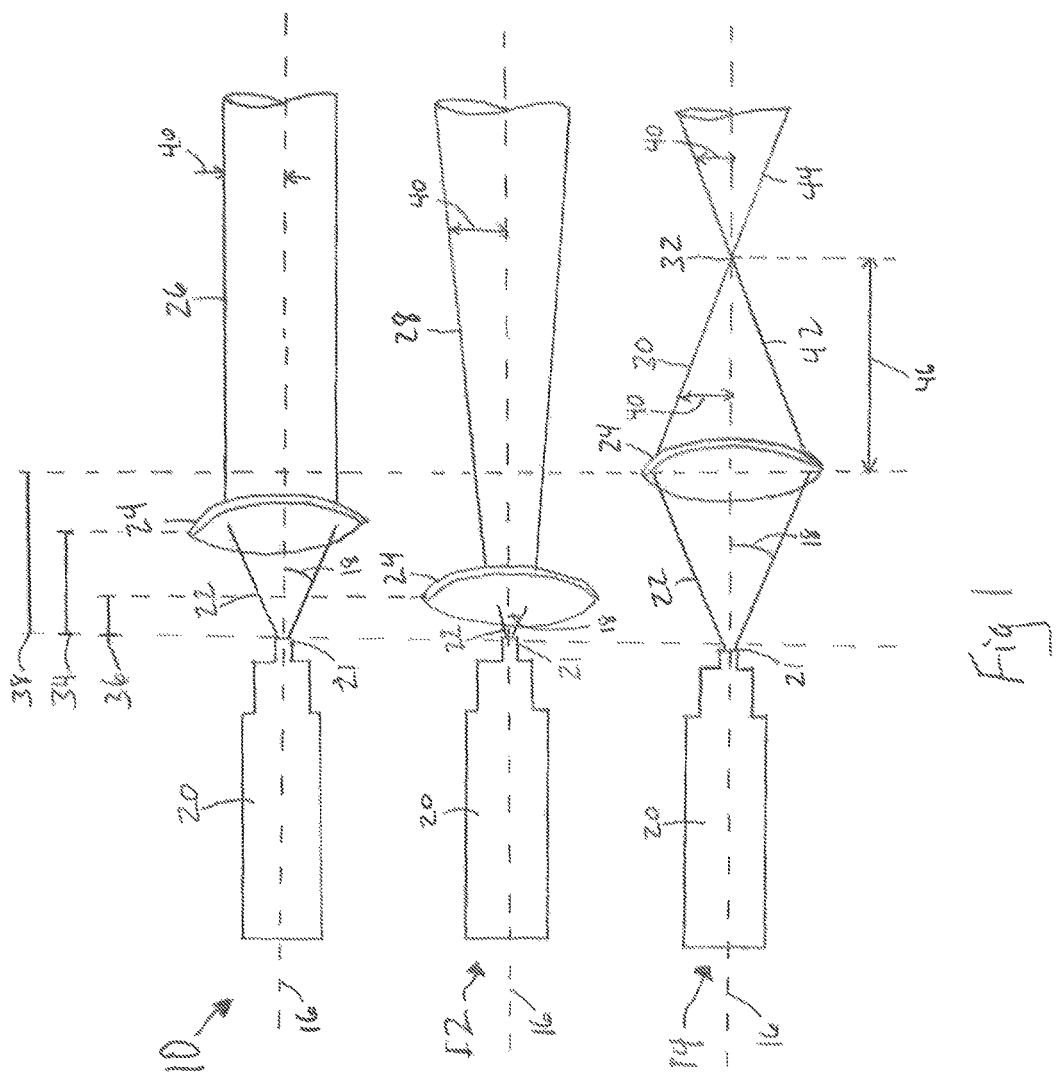
FIG. 1 is a diagram showing three laser output configurations.

Referring initially to FIG. 1, three different laser configurations is shown. The first one is a collimating laser 10. Laser 10 comprises a laser body 20, out from which is raw laser beam 22 along central axis 16. Raw beam 22 exits laser body 20 at angle 18 from central axis 16. Raw laser beam 22 then passes through lens 24, which is located distance 34 from the laser output 21. Due to the effects of lens 24, lens 24 transforms raw laser beam 22 into collimated beam 26, where the outside of beam 26 maintains a constant distance 40 from central axis 16 along the length of beam 26.

Laser 12 is a diverging laser. Laser 12 consists of the same components as laser 10. However, in laser 12, lens 24 is a shorter distance 36 from laser output 21 of laser body 20 as compared to laser 10. The result of the shorter distance D2 on raw beam 22 is that beam exiting from lens 24 continually diverges further away from axis 16 as beam 28 gets further from lens 24. Put another way, distance 40 continually Increases as beam 28 moves away from lens 24. A consequence of a diverging beam 28 is that the light density of the beam eventually decreases to the point where the beam can no longer be seen. This is in contrast to collimated beam 26, where, under optimal conditions, the light density remains constant along the length of the beam 26.

Last in FIG. 1, diverging laser 14 is shown. Laser 14 has the same mechanical components as laser 10 and laser 12. However, lens 24 of laser 14 is located a distance D3 38, which is further away from laser output 21 then in laser 10 and laser 12. The result of lens 24 located at distance 38, is that converging beam 30 has a converging portion 42, a focal point 32 having a focal distance 46, and a diverging portion 44. When raw beam 22 interacts with and exits lens 24, beam 30 will converge, meaning that distance 40 decreases until beam 30 reaches focal point 32, where all photons that make up beam 30 pass through a single point in space, also called the focal point of the beam. After passing through focal point 32, beam 30 starts to diverge from central axis 16 in a manner similar to laser 12. As shown in FIG. 1, if distance 38 equals distance 34, then the output beam from lens 24 is collimated, as shown with laser 10. As distance 38 increases away from lens 24 and laser body 20, focal point 32 forms at focal distance 46, which may be a long distance from lens 24 depending on the size and density characteristics of raw beam 22. As distance 38 further increases, focal distance 46 decreases thereby moving the focal point 32 closer to lens 24. It is to be appreciated by someone skilled in the art that lens 24 may only be moved to a certain distance 38 from laser output 21 before raw beam 22 diverges to a size greater than the radius of lens 24. After passing the certain distance, a portion of raw beam 22 will not interact with lens 24 resulting in an outer portion of raw beam 22 to propagate in a diverging manner beyond lens 24, where the remaining inner portion of raw beam 22 is acted upon by lens 24, which typically results is a beam inside of another beam.

Figure 2:
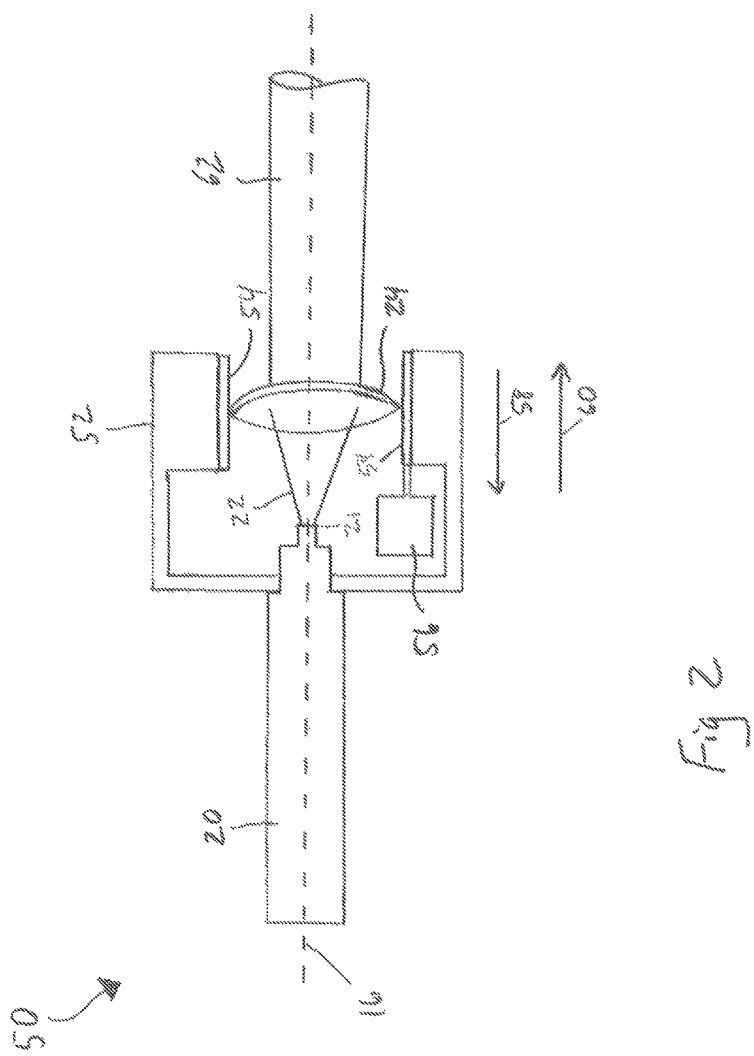
FIG. 2 is a diagram of a laser unit showing a laser with a focus function, an aperture, and an anti-reflective panel.

Moving now to FIG. 2, a diagram of a laser unit having an automated focus function is shown and generally designated 50. Laser 50 consists of laser body 20 that generates raw laser beam 22 exiting from laser output 21. Adapted to laser body 20 is focus mechanism 52. Focus mechanism 52 consists of lens rails 54 and motor 56. Lens 24 fits into lens rails 54 thereby allowing lens 24 to move in directions 58 and 60. Motor 56 is responsive to an external signal that causes motor 56 to rotate in a specific direction. As motor 56 rotates in one direction, lens 24 moves in direction 58, thereby causing output beam 62 to increase its divergence from central axis 16. As motor 56 rotates in the opposite direction, lens 24 moves in direction 60, thereby decreasing the divergence of output beam 62, eventually causing raw beam 22 to form a collimated beam 28. As motor 56 moves lens further from laser output 21, output beam 62 forms a converging beam, as discussed above for FIG. 1. The focus mechanism 52 described above is merely representative of a focus function for a laser device. Other mechanisms useful to control the characteristics of a raw laser beam are fully contemplated and do not diverge from the scope and spirit of the present invention.

It is to be appreciated by someone skilled in the art that the intensity of beam 62 may vary be varying the output intensity from laser body 20. For the lasers discussed above for FIGS. 1 and 2, the output intensity of raw beam 22 affects the intensity of any beam that exits lens 24. Therefore, varying a lens' distance from a laser output 21, combined with varying the intensity of the raw beam 22, results in output beams 62 exhibiting various and differing characteristics.

Figure 3:
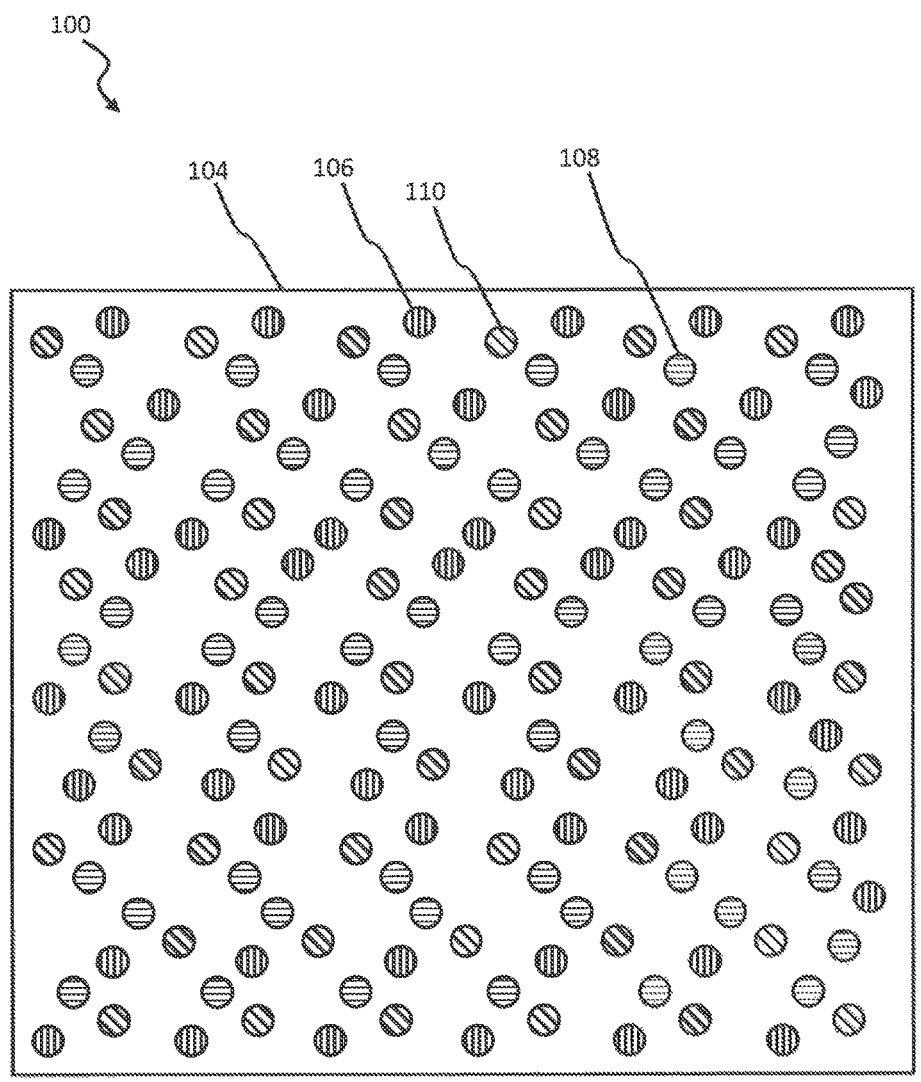
FIG. 3 is a top view of a laser array, where the array consists of red, green, and blue lasers.

FIG. 3 is a top view of a laser array and generally designated 100. Laser array 100 consists of laser board 104 configured to mount individual lasers. Laser array 100 further consists of multiple red lasers 106, multiple green lasers 108, and multiple blue lasers 110, where each color laser is mounted to laser board 104 in a distributed pattern. As shown in FIG. 3, the red lasers 106, green lasers 108, and blue lasers 110 are intermixed on laser board 104 in a somewhat consistent pattern, however the layout of the lasers 106, 108, and 110 on the laser board 104 may vary without departing from the scope and spirit of the invention.

Each of the lasers are mounted in such a way that the central axis of each laser 106, 108, and 110 are collinear. It is to be appreciated by someone skilled in the art that pattern associated with the layout of the lasers does not have to be perfectly symmetric. In fact, an asymmetrical layout may be desired if more lasers of one color are needed to achieve the necessary intensities to be able to display colors from across the visible spectrum. For example, more red lasers 106 may be needed than green lasers 108 and blue lasers 110. This may be due to the nature of the laser construction or other limitations associated with a specific color laser. However, it is also to be appreciated by someone skilled in the art that some variation in the placement of the different color lasers on laser board 104 is possible without departing from the objective of the present invention.

In operation, the lasers 106, 108, and 110 mounted to laser board 104 are aligned such they share a common output axis, similar to central axis 16 of lasers 10, 12, and 14. Since red, green, and blue may be combined in varying amounts to create differing colors, the red lasers 106, green lasers 108, and blue lasers 110 may be energized at varying intensities to form a combined output beam 136 (See FIG. 5) of a specific color. The ability to form a combined output beam is due to the close proximity of lasers 106, 108, and 110, which allows mixing of the individual output beams thereby forming the combined output beam of a specific color.

Figure 4:
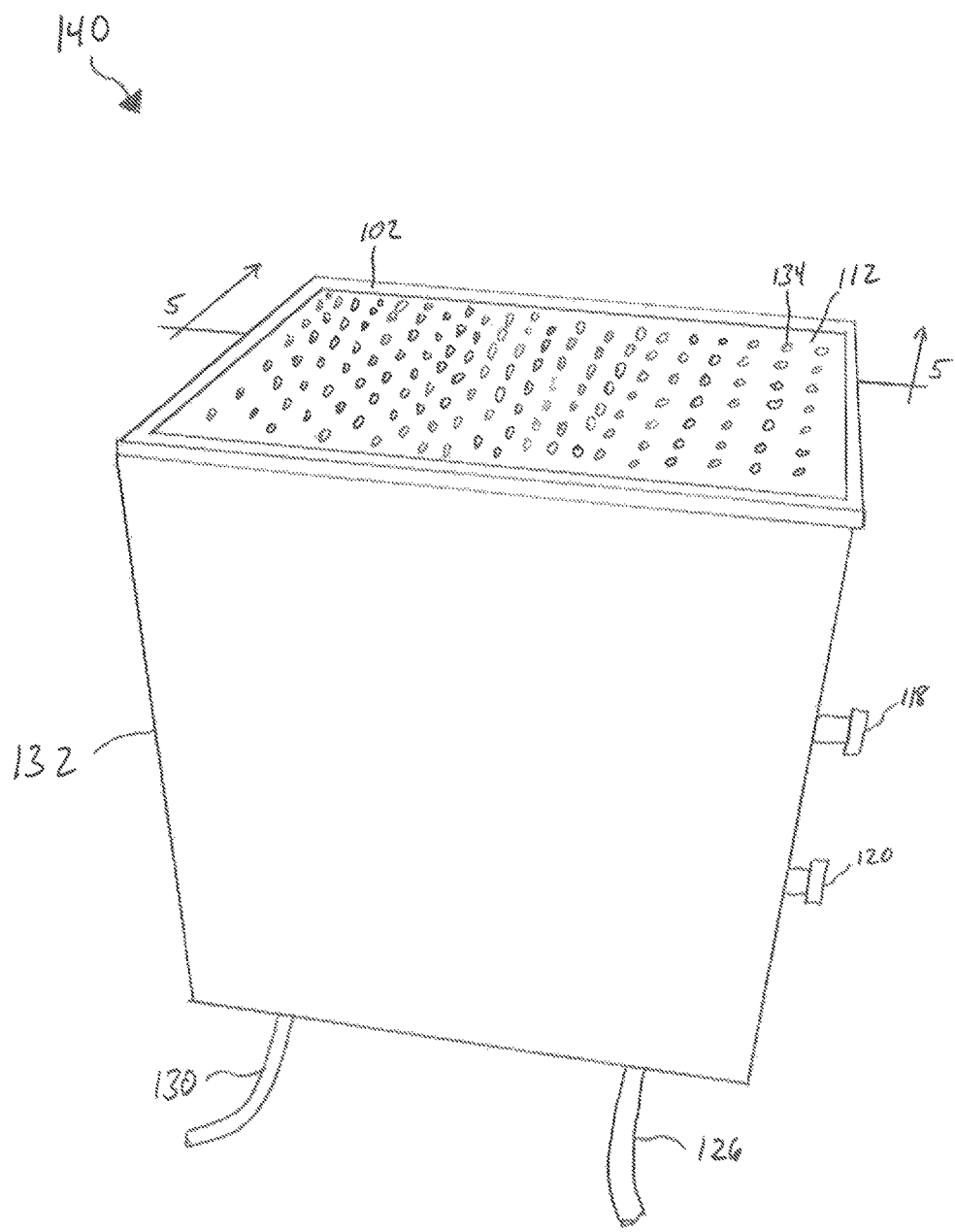
FIG. 4 is a perspective view of a Laser Sky Cannon (LSC) showing the case, input and output cooling connections, a power connection, a communication and control connection, an anti-reflective (AR) cover.

FIG. 4 is a perspective view of a Laser Sky Cannon (LSC) of the present invention and generally designated 140. LSC 140 consists of case 132 sized to hold laser board 104 and all supporting internal components. Shown near the top of case 132 is a case rim 102 sized to fit anti-reflective (AR) cover 112. Below AR cover 112 is aperture plate 114 having individual apertures 134 mounted in a collinear manner. The layout of aperture plate 114 is the same as the layout of lasers on the laser board 104 (See FIG. 3). Due to the heat generated by the LSC's 140 internal components, a cooling coil 122 (See FIG. 5) is installed inside the case 132. Cooling coil 122 has input cooling connection 118 and output cooling connection 120 to supply a cooling medium, such as water, to the LSC 140. Also shown in this figure is power connection 126, which supplies all required power to the LSC 140 and command and control connection 130, which allows for a remote operator to operate the LSC.

Figure 5:
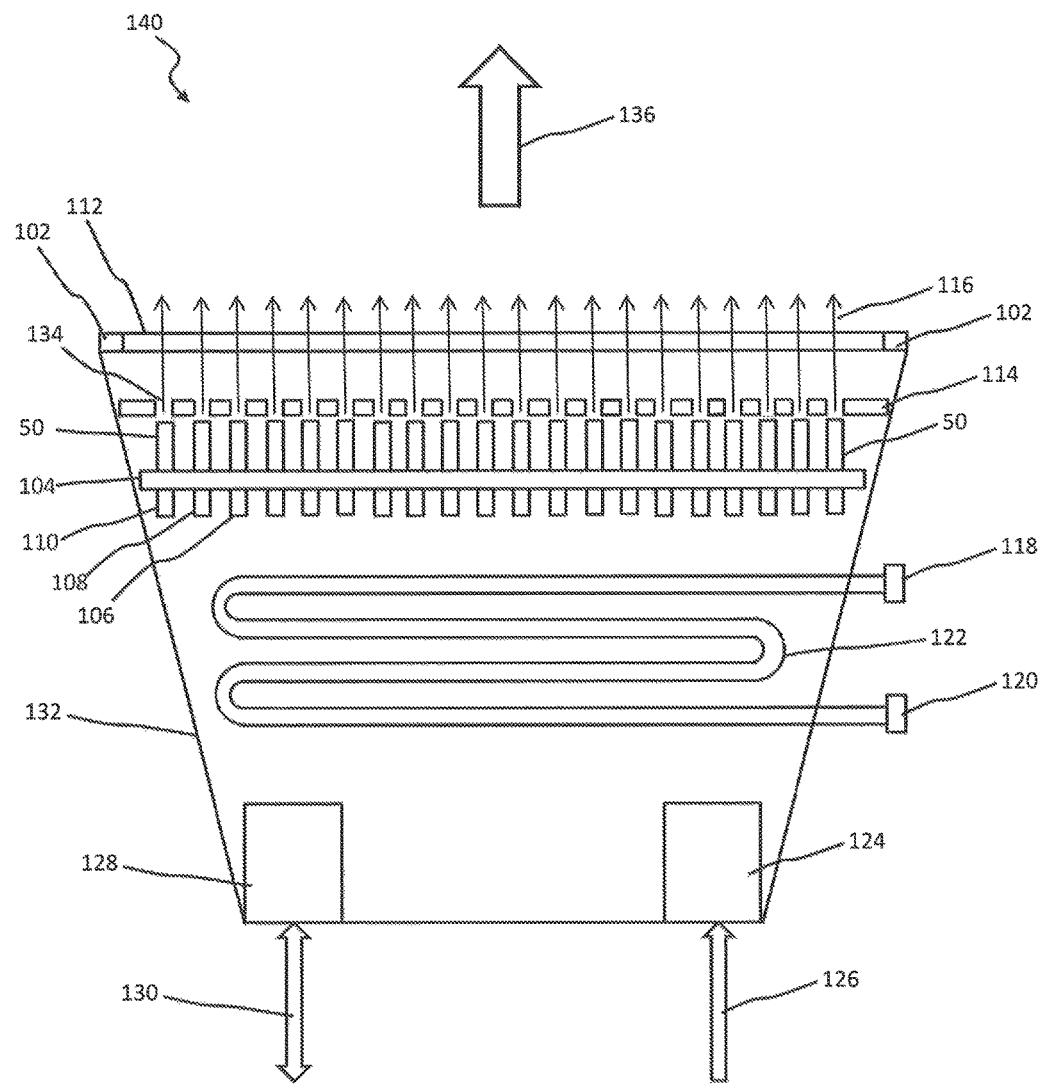
FIG. 5 is a side cut-away view of a laser array with cooling mounted in a base unit.

Now referring to FIG. 5, a side cutaway view taken along line 5-5 of FIG. 4 is shown. LSC 140 comprises lasers 106, 108, and 110 mounted to laser board 104, which is mounted inside case 132. Above laser board 104 and lasers 106, 108, and 110 is aperture plate 114, which consists of an individual aperture 134 for each laser 106, 108, and 110 mounted to laser board 104. The center of each individual aperture 134 is located approximately at the center axis 16 (see FIGS. 1 and 2) of each individual laser. The apertures 134 help to collimate each individual laser beam 116 by blocking stray photons of light that diverge from the individual output beam's 116 central axis. After beam 116 passes through aperture 134, it passes through anti-reflective (AR) cover 112. Cover 112 is anti-reflective to help minimize any beam 116 distortion as it passes through the cover 112. Also located inside case 132 is cooling coil 122, which has input cooling connection 118 and output cooling connection 120 located on the outside of case 132. The inside of case 132 also contains power supply 124 and controller 128.

Power is applied to the LSC 140 through power connection 126, which connects to power supply 124. Power supply 124 in turn connects to the LSC's internal components, such as lasers, fans, and any external components, such as a movement and pointing system (See FIGS. 6 and 7). Power supply 124 may supply a fixed voltage or a variable voltage to each individual laser. In a preferred embodiment of the present invention, power connection 126 may be to a standard 110 volt, 15-amp outlet. The LSC's 140 input power requirements will vary depending on the number and size of the individual lasers mounted inside case 132. Due to the heat generated by the components internal to case 132, cooling coil 122, having input cooling connection 118 and output cooling connection 120, absorbs the internally generated heat. In a preferred embodiment, fresh water may be used as the coolant circulated through cooling coil 122. If the internal heat generated is expected to exceed a certain threshold, other coolants, such as antifreeze, may be used to increase the cooling capacity. The cooling system 122 shown in FIG. 4 is merely exemplary for explanation purposes. The present invention encompasses cooling coils mounted directly to laser board 104, coolant supplied directly to each individual laser 106, 108, and 110, or coolant circulated through channels inside the laser board 104. Internal circulation fans and vent fans to aid in heat removal are also contemplated. Internal fans may assist with the removal of heat from the case's interior by continually moving air across the laser bodies and a cooling coil. Cooling coils and lasers may also have cooling fins to increase the available heat transfer area. A vent fan may be used if the ambient environment is cold enough to support adequate heat removal for the given LSC 140 configuration.

Connected to controller 128 is command and control connection 130. Connection 130 may be hardwired or wireless and is configured to communicate with a central control system (See FIG. 8). The interface between a remote control and the LSC 140 may be Ethernet, RS232/422/485, or other point-to-point communication protocol. To operate the LSC 140 in a preferred embodiment, a remote operator sends command and control signals to the LSC's 140 control module 128 through connection 130. The command and control signal may be a requested operation or a request for data. If the signal is for a requested operation, the controller 128 executes the requested operation. The requested operation may be for a specific color laser 106, 108, or 110 to change intensity thereby changing the overall color of the LSC's 140 output beam 136 or to rotate the LSC 140 to point in a different direction.

If power supply 124 supplies a fixed voltage to each laser 106, 108, and 110, controller 128 will send a change of intensity signal to all same color lasers, or a subset of lasers, thereby causing those lasers to either increase intensity, decrease intensity, or turn off. This will have the effect of changing the color of output beam 136. If power supply 124 provides a variable voltage to each laser 106, 108, and 110, controller 128 sends the required signal to power supply 124, which in turn changes the voltage supplied to a specific color laser 106, 108, or 110. The change in voltage causes the laser's intensity to change, thereby changing the color of the LSC's 140 overall output beam 136.

In a preferred embodiment of the present invention, the output of each laser 106, 108, and 110 is individually controlled, thereby allowing the LSC's 140 output beam 136 to strobe, flash, fade, and dynamically change color. Individual control also allows for multiple discreet colors in output beam 136, such as red, white, and blue, where the colors may dynamically flow across the output beam 136 by systematically changing the intensity of the individual lasers. In an alternative embodiment, one bank comprises all red lasers 106, a second bank comprises all green lasers 108, and a third bank comprises all blue lasers 110, where each bank is independently controllable. This configuration only allow for one output beam capable of changing color. In other alternative embodiments, lasers 106, 108, and 110 are controlled in banks, where the banks comprise a grouping of same color lasers or a group of lasers of mixed colors. For example, if LSC 140 is configured with multiple banks of mixed color lasers, the LSC's 140 output beam 136 may be set to display red, white, and blue simultaneously in the same output beam 136. Also, if the output intensity of each laser 106, 108, and 110 is individually controlled, specific lasers may be turned off when the output beam 136 consists of discreet color beams to minimize any mixing between the discreet color beams. For example, individual lasers between two banks may be turned off to provide a gap between the colored laser output beams thereby minimizing any mixing between the beams.

Figure 6:
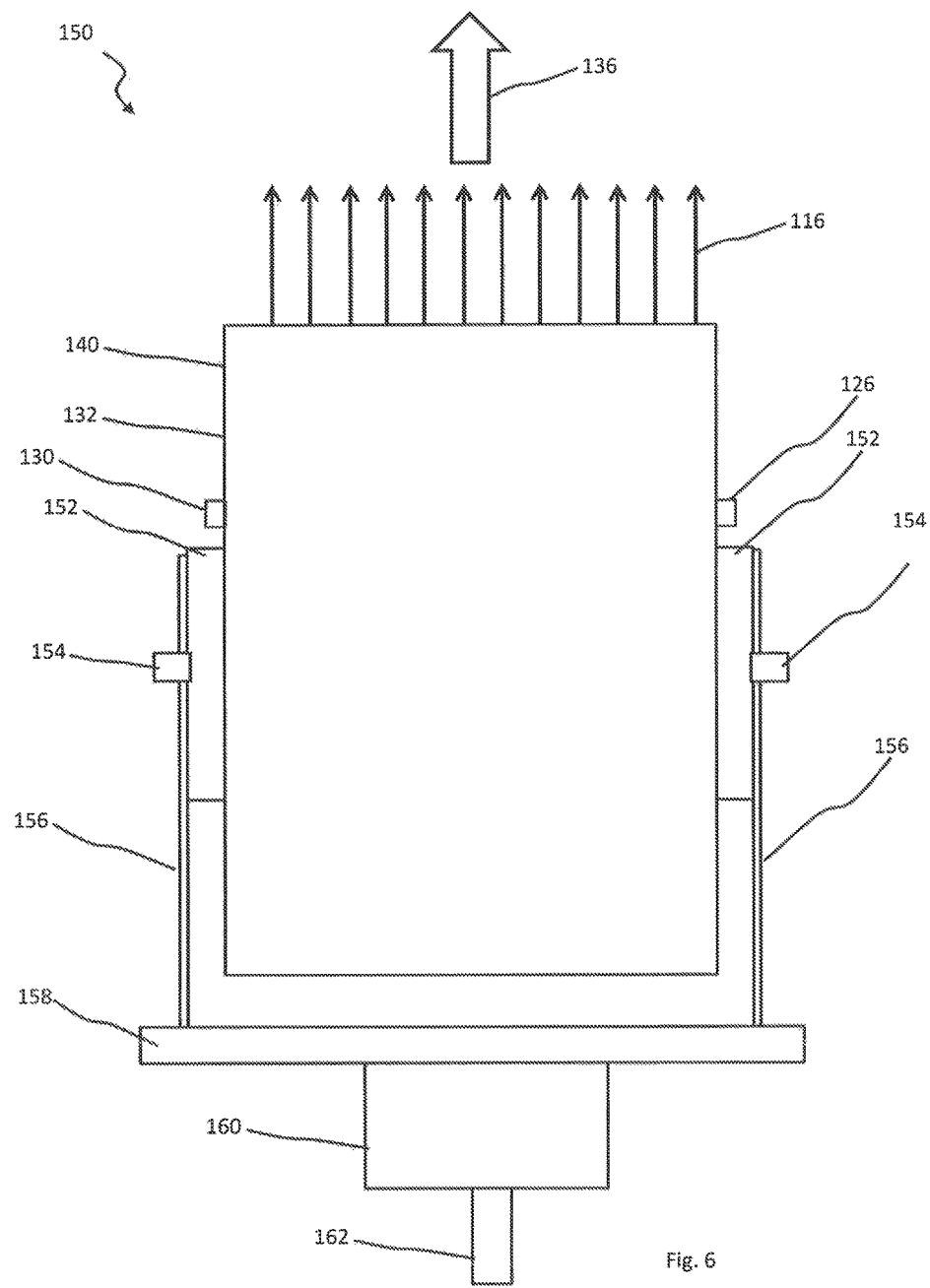
FIG. 6 is a side view of the laser base unit mounted on a gimbal system where the LSC points in the vertical direction.

Moving now to FIG. 6, a side view of an LSC 140 mounted to a gimbal system is shown and generally designated 150. System 150 consists of an LSC 140 and a gimbal system that moves the pointing direction of the LSC 140. The gimbal system consists of two motors 152 mounted to opposite sides of case 132. The motors are located at a position such that the LSC is balanced when the LSC 140 is rotated to the horizontal position (See FIG. 7). Motors 152 attach to hinges 154, which are fixedly attached to mounting arms 156. To move the LSC 140 from a vertical position to a horizontal position, thereby changing the elevation of the LSC's output beam 136, motors 152 rotate against hinges 154 thereby allowing the motors 152 to change the LSC's 140 elevation. This portion of the gimbal system allows the LSC 140 to go from a horizontal position, up to a full vertical position, then back down the other side to a horizontal position. This range of movement increases the dynamic capability of the LSC 140 to create a smooth moving output beam 136.

Mounting arms 156 are fixedly attached to base plate 158. Rotatably attached to the bottom of base plate 158 is motor 160. Motor 160 removably attaches to mounting post 162. To rotate base plate 158, thereby rotating LSC 140, motor 160 rotates the base plate 158 a full 360 degrees. However, to accommodate connected power, communication, and cooling lines, the gimbal system will not continue to rotate the LSC 140 in the same direction to minimize the chances of becoming over twisted. If the any cooling lines going to the LSC 140 become pinched such that coolant flow is reduced or completely blocked, the LSC 140 may overheat where the unit will automatically shutdown to protect itself. In a preferred embodiment, the remote operator may have the LSC 140 return temperature and other data from the LSC 140 to be displayed on the remote control system. If the LSC 140 is used with a gimbal system, position and other gimbal information may also be returned to the remote control system.

Figure 7:
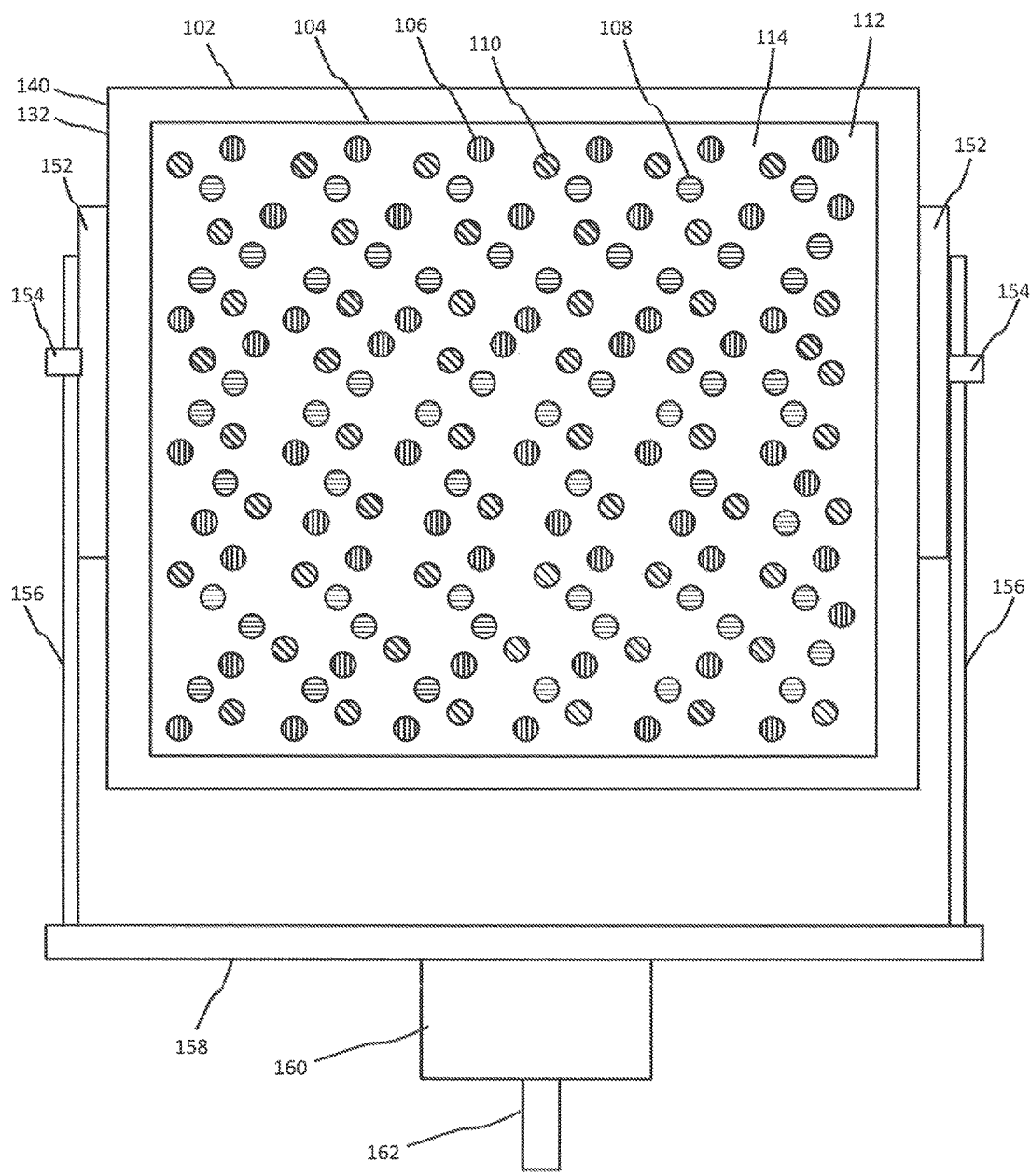
FIG. 7 is a side view of the LSC mounted on a gimbal system where the LSC points in a horizontal direction.

Referring now to FIG. 7, a side view of an LSC 140 mounted to the gimbal system described in FIG. 6 is shown. Motors 152 have moved the LSC 140 from the full vertical position, as shown in FIG. 6, to the full horizontal position, as shown in this figure. When in the full horizontal position, the individual lasers 106, 108, and 110 can been seen through AR cover 112 and aperture plate 114.

Figure 8A:
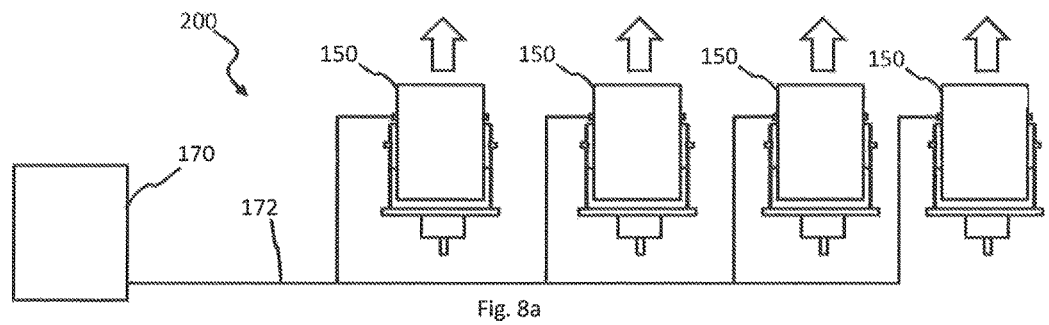
FIGS. 8a-8d are a block diagrams of the laser system showing multiple LSCs and a remote control system connected using LAN, wireless, and a combination of communication protocols to link the LSCs to the remote control system.

Moving now to FIGS. 8a-8d, various LSC control configurations are shown. FIG. 8a, generally designated 200, shows four (4) LSC's 150 connected to a remote control unit 170 through communication network 172. Network 172 may be a LAN, serial, or parallel network known in the art. Remote control unit 170 controls the movement and the LSC's 150 output beam 136 color and intensity by sending commands to each LSC's 150 controller 128 (see FIG. 5). A system operator may control the movements, color, and intensity in real time. Alternatively, a third party may control the movement, color, and intensity using an application on a personal communication device, such as a cell phone or a tablet device.

Movement, color, and intensity may also be controlled through a preprogrammed operation sequence. The system operator may create the operation sequence locally on the remote control unit or on another electronic device then loaded into the remote control unit 170. In certain embodiments of the present invention, the operator may execute the operation sequence from an electronic device. Other embodiments require that an operator execute the operation sequence from the remote control unit, which may be preferable when laser safety is an issue.

Figure 8B:
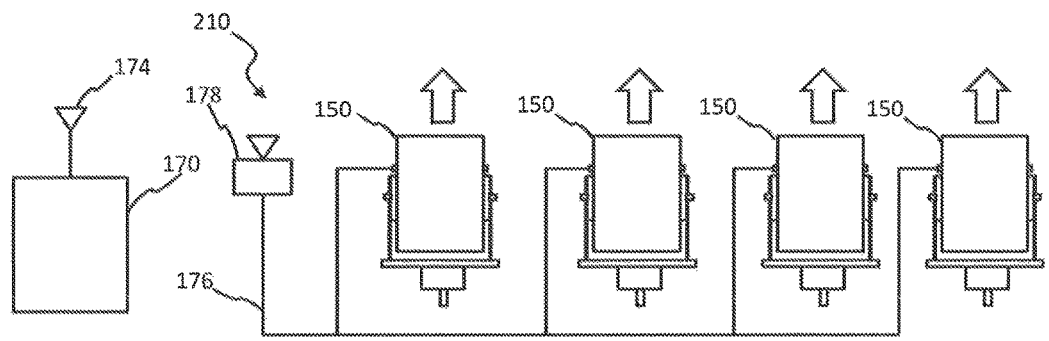

FIG. 8b shows another embodiment of the laser system of the present invention and is generally designated 210. System 210 comprises four (4) LSCs 150 connected to a local network 176, a transceiver 178, and a remote control unit 170 that has a wireless transceiver 174. Local network 176 connects to transceiver 178, which communicates wirelessly with transceiver 174. The wireless nature of system 210 allows for easier transport, setup, and operation of system 210. This may be especially helpful if the LSC's 150 are used in a large venue, such as a stadium or a large outdoor area, where it could be extremely difficult to connect the LSCs 150 to the remote control unit 170 using hardwired connections, such as in system 200. Transceivers 174 and 178 may communicate using WiFi, cellular, RF, or any other communication protocol known in the industry without departing from the scope and spirit of the present invention.

Figure 8C:
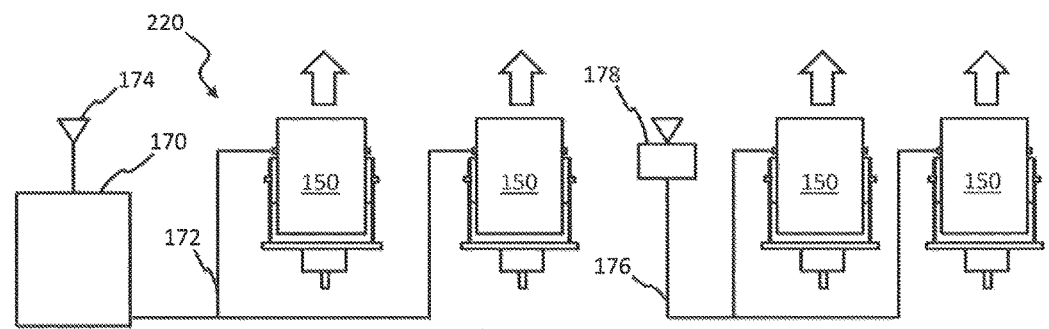

FIG. 8c shows a hybrid system and is generally designated 220. System 220 comprises four (4) LSCs 150, a local network, 176, a communication network 172, a wireless transceiver 178, and a remote control unit having a wireless transceiver. Two of the LSCs 150 connect to transceiver 178 through local network 176, which in turn connects to the remote control unit 170 by communicating with transceiver 174. The other two LSCs 150 connect directly to remote control unit 170 through communication network 172. The remote control unit 170 coordinates the operation of the LSCs 150 by sending control commands either through the wireless link or through the hardwired communication network 172.

Figure 8D:
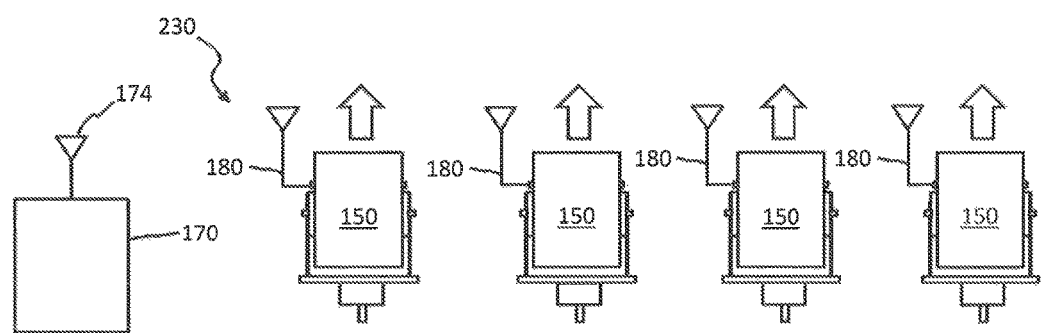

FIG. 8d shows a complete wireless system of LSCs 150 and a remote control unit 170. Each LSC 150 has a wireless transceiver 180. The wireless transceiver 180 may be built into each LSC or may be connected to an external connection 130 (see FIG. 5). In operation, the remote control unit 180 communicates with each LSC 150 through the transceivers 174 and 180 to control the movement, color, and intensity of each LSC's 150 output beam 136.

It is to be appreciated by someone skilled in the art that the LSC's 150 and their associated connection to remote control unit 170 may be implemented using a combination of the connection schemes disclosed with FIGS. 8*a*-8*d*. For example, a light show may have multiple rotatable LSCs 150 and stationary LSCs 140 where some of the LSCs 140 and 150 connect to the remote control unit 170 through a hardwired communication network 172, others connect through a local network 176 connected to a transceiver 178, and others each connect individually through transceiver 180.

Figure 9:
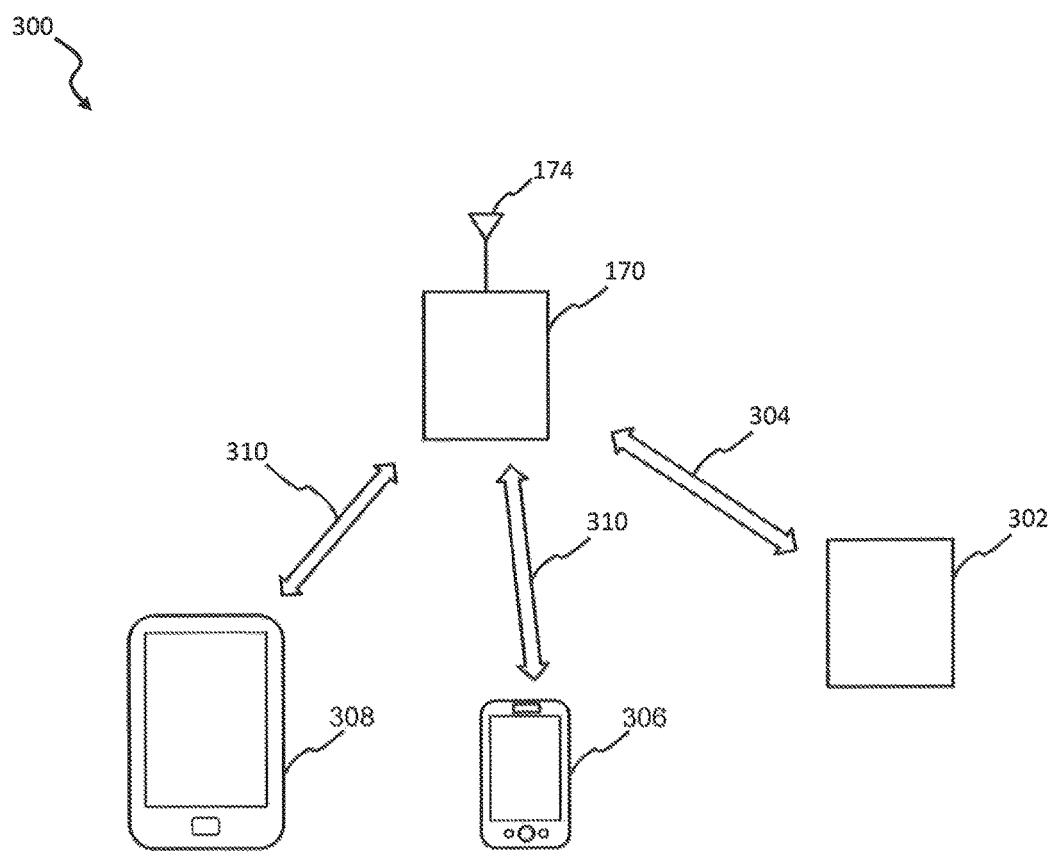
FIG. 9 is a block diagram of a remote control system connected to a laser show system and remote users, where the remote users utilize an application installed on a personal communication device to interact with the remote control system.

FIG. 9 is a block diagram of a laser and light show control system having a remote control system, a laser and light show system, and remote users and is generally designated 300. Remote control system 170 connects to laser and light show system 302 through any communication protocol known in the art. Laser and light show system 302 may consist of one or more LSCs 140 and 150 as well as other laser, lighting, and special effects devices or systems generally used to produce a laser and light show. Remote control system 170 also allows third parties to connect to the remote control system 170 and operate some or all portions of the laser and light show system 302. As shown in FIG. 9, a cell phone 306 and a tablet 308 connect to remote control system 170 through communication link 310. Communication link 310 may be any wireless communication protocol known in the industry, such as Wi-Fi, cellular, and any short-range protocol such as Bluetooth™ and infrared.

To interface with the remote control unit 170, a user of a cellphone 306, tablet 308, or other personal communication device must install a custom application onto his or her device. The application allows a user to receive information and prompts from the remote control unit then provides an input based on the information and prompt. Depending on the information and prompts displayed to the user through the application, the user's input may be to control a portion of the laser and light show system or the laser and light show in its entirely, such as initiating the laser and light show 302. Alternatively, the users input may be provided for a secondary reason, such as during the playing of a game. For example, a user may be allowed to participate in a laser roulette game, where the remote control unit 170 asks a user to guess an LSC's 150 final output color. After providing his or her guess, the remote controller then cycles through a series of colors until it stops on a final color. If the user picked the final color, he or she wins the game. Other functions include a user being allowed to input a message into the application, where one or more LSCs 150 modulate their respective output beams 136 using Morse code to represent the user's message. Other implementations allow a user to have a custom message, such as "Will You Marry Me?" or "Happy Birthday!" displayed using lasers. The application on the communication devices may also allow the communication device to watch then decode a modulated output beam containing a message.

It is to be appreciated by someone skilled in the art that a secondary computing system in communication with the remote control unit 170, instead of the remote control unit 170 itself, may be used to interface with cell phones 306, tablets 308, or other electronic devices to control the playing of a game or the display of custom messages. The secondary computing system may provide appropriate inputs to the remote control unit 170, thereby coordinating the overall operation of system 300.

As discussed above for FIG. 9, the user's input may be to have a laser display a personal message, modulate the output beam of a LSC in a format that represents the user's input, or for a user to participate in a game, such as Laser Roulette. In a preferred embodiment, a user need not need to pay a sum of money to interact with the remote control system. Alternative embodiments may require a user to pay a sum of money for the privilege to interact with the remote control system. For example, if an event is held for charity, a user may be required to provide a donation before the user is allowed to receive a prompt and provide input to the system. Other embodiments of the present invention may require a user to establish an account having a monetary value before being allowed to receive prompts and provide input based on the prompt.

Alternative embodiments may also include the ability to automatically vary color and intensity based on audio captured from the event. For example, the laser and light show may respond to crowd noise levels, music from a concert, or the action of a sporting event. The system operator may program the system to respond to specific sounds or sound levels with a specific color.

Figure 10:
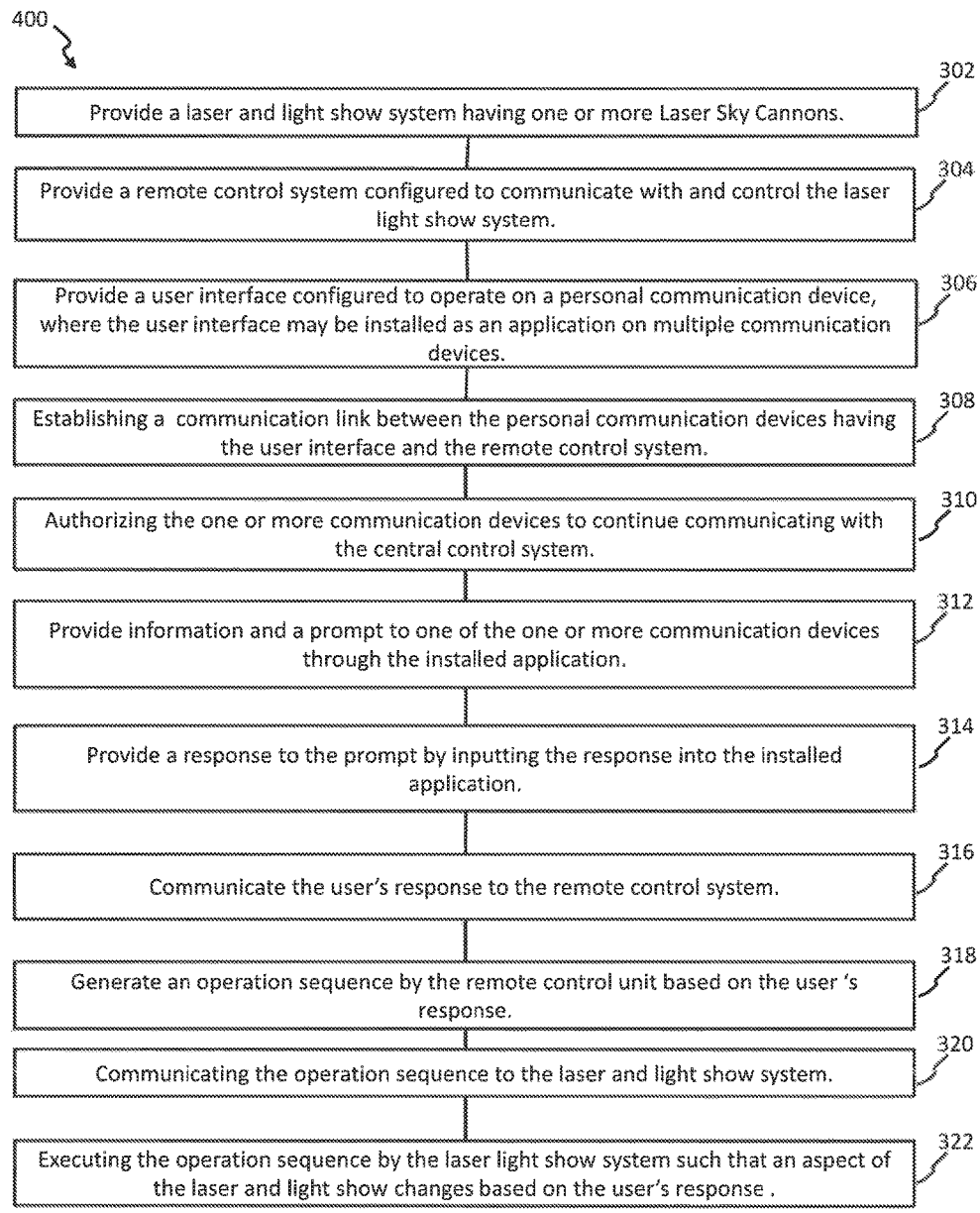
FIG. 10 is a process flow diagram showing the operation of a laser light show system having at least one LSC by a remote user through an application installed on a personal communication device.

Moving now to FIG. 10, a process flow diagram showing the operation of a laser and light show using a third party user's input and generally designated 400. In step 302, a laser and light show operator provides a laser and sight show system having one or more Laser Sky Cannons 150. Step 304 also has the show operator provide a remote control system configured to communicate with and control the laser and light show system. Next, in step 306, third party users are provided with a user interface application configured to operate on a personal communication device, such as a cell phone or a tablet. A user may download and install the application on the user's device. Other user's may also download and install the application. In step 308, once within range of the remote control unit, the user's device, through the application, establishes a communication link to the remote control system. After establishing the communication link, step 310 has the remote control system authorize the communication device to continue communicating with the remote control system.

After the user's device is authorized to continue communicating, step 312 has the remote control system provide information and a prompt to one of the communication devices through the installed application. In step 314, the user provides a response to the prompt by inputting his or her response into the installed application. Next, in step 316, the installed application communicates the user's response to the remote control system.

In step 318, after receiving the user's response, the remote control system generates an operation sequence based, in part, on the user's response. In step 320, the operation sequence is communicated to the laser and light show system, where the laser and light show system is configured to execute the operation sequence. Lastly, in step 322, the laser and light show system executes the operation sequence such that an aspect of the laser and light show change based, in part, on the user's response.

Figure 11:
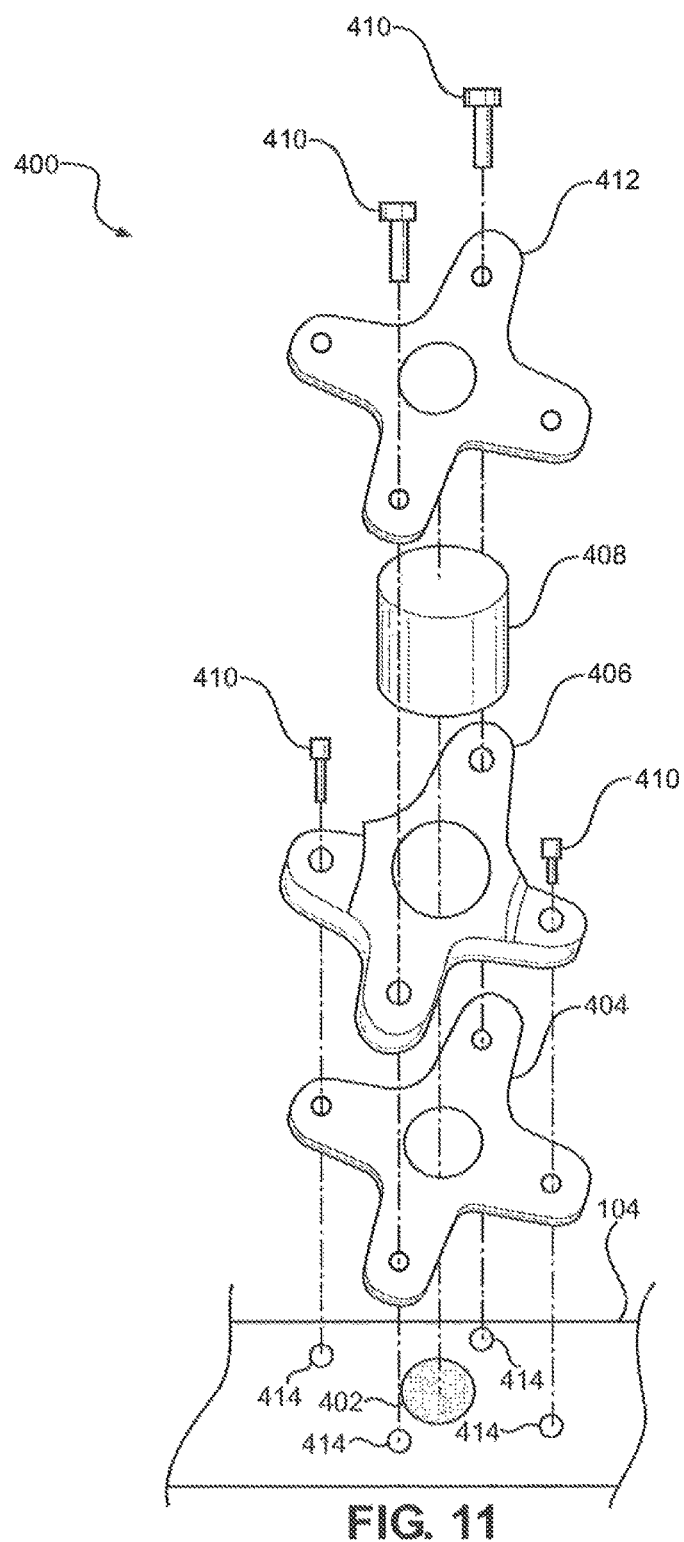
FIG. 11 is an exploded perspective view of an alternative laser mounting configuration.

Moving now to FIG. 11, an exploded perspective view of an alternative laser mounting configuration is shown and generally designated 400. Mounted into laser board 104 is laser 402, which is installed into laser bore 416 (see FIG. 12). Surrounding laser 402 are four (4) screw bores 414. After laser 402 is installed into laser bore 416, laser fixator plate 404 is centered and placed over laser 402 where the screw holes are aligned with screw bores 414. Lens adapter 406 is then centered and placed over the laser fixator plate 404. Two (2) screws 410 are inserted through the screw holes in the lens adapter 406, the laser fixator plate 404, and screwed into screw bores 414, thereby holding the laser 402, laser fixator plate 404, and lens adapter 406 in place on the laser board 104.

The interior of lens adapter 406 is threaded and configured to receive lens 408. The threaded nature of the lens 408 and lens adapter 406 allows for the focus of the laser to be adjusted until the desired focus is achieved. One the laser is properly focused, the lens fixator plate 412 is centered and placed over lens 408. Two (2) screws 410 are passed through the screw holes of the lens fixator plate 412 and screwed into the lens adapter 406. The screw holes in the laser fixator plate are larger than the diameter of screws 410, thereby allowing for the alignment adjustment of the alternative laser mount 400.

Figure 12:
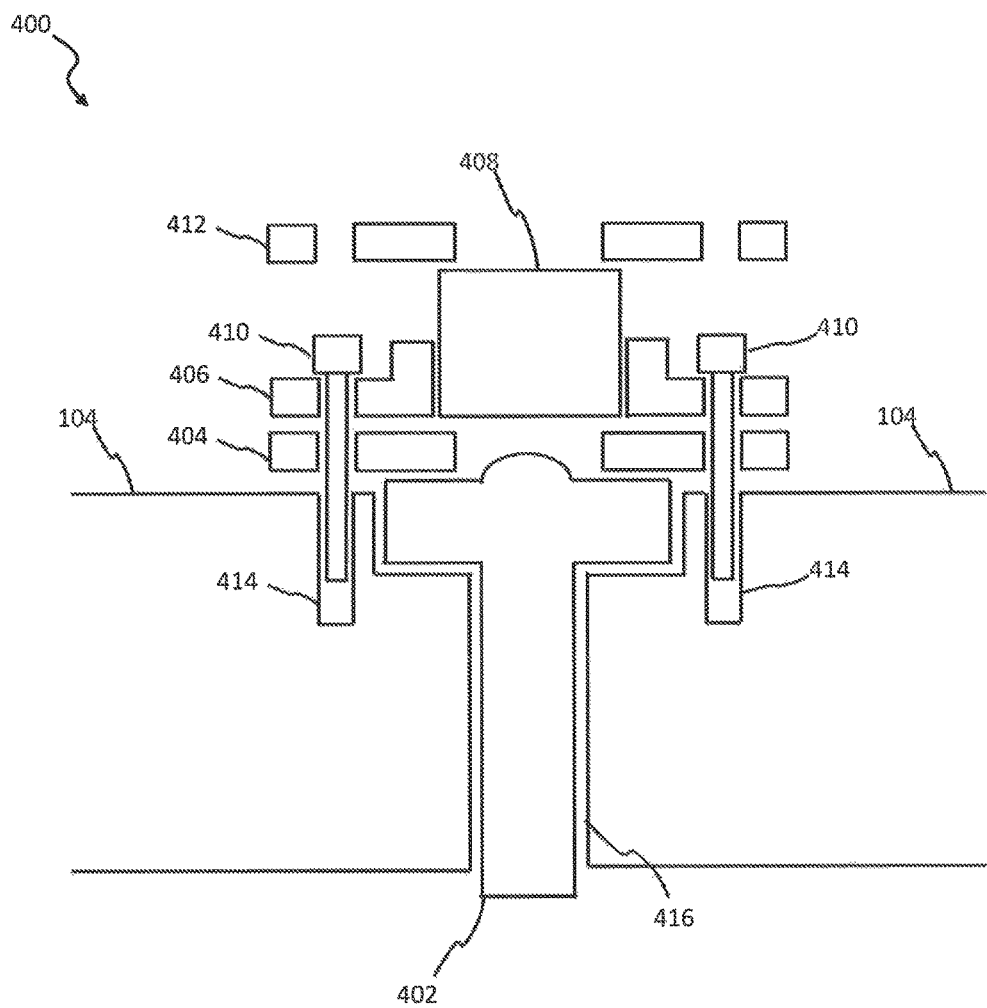
FIG. 12 is a side cutaway view of the alternative laser mounting configuration of FIG. 11.

FIG. 12 is a side cutaway of the alternative laser mounting configuration 400 as shown in FIG. 11. It is to be appreciated by someone skilled in the art that the gaps between the individual components shown in FIG. 12 are merely for explanatory purposes. As shown, laser 402 is installed into laser bore 416. Laser bore has a recess 418 such that top of laser 402 is flush with the top surface of laser board 104. Above laser 402 is laser fixator plate is lens adapter 406 held in place with two (2) screws 410 threaded into screw bores 414 in laser board 104, thereby holding the laser 402, laser fixator plate 404, and lens adapter 406 in place. Lens 408 is threaded into lens adapter 406. Lastly, lens fixator plate 412 is screwed into lens adapter 406 using two (2) screws 410 (not shown, see FIG. 11).

In operation, shims or spacers may be inserted between the laser board 104 and the laser fixator plate 404 or between the laser fixator plate 404 and the lens adapter 406, or both, to mechanically align the laser's 402 output.

It is to be appreciated by someone skilled in the art that multiple LSCs may be connected to form a larger and more powerful laser beam, by placing the LSCs in close proximity to each other and aligning each LSC to share a common axis. This configuration of multiple LSCs allows for a single output beam to be composed of multiple colors and intensities. This configuration also allows for a spare LSC to be installed next to, and aligned with, a first LSC. If the first LSC fails during a laser and light show, the remote control system energizes the spare LSC thereby maintaining show continuity. Alternative embodiments of the present invention include the ability to control one LSC or multiple LSCs at a time, choreograph laser and light movements and colors to compliment stage acts or event introductions, such as at a sporting event.

It is to be appreciated by someone skilled in the art that the various features of one or more embodiments may be combined with various features of one or more other embodiments without departing from the spirit and scope of the present invention.

While there have been shown what are presently considered to be preferred embodiments of the present invention, it will be apparent to those skilled in the art that various changes and modifications can be made herein without departing from the scope and spirit of the invention.

What is claimed is:

1. A laser light show system comprising:
one or more laser sky cannons, each laser sky cannon comprising:
a case,
a laser array comprising a laser board, a plurality of red lasers mounted on said laser board, a plurality of green lasers mounted on said laser board, and a plurality of blue lasers mounted on said laser board, said laser array mounted in said case and configured to generate an output beam,
an aperture plate mounted above said laser array,
an anti-reflective cover mounted above said aperture plate,
a gimbal system comprising motors configured to move said output beam, and
a command and control connection configured to receive commands to operate said laser sky cannon;
a remote control unit; and
a communication network,
wherein said communication network facilitates communication between said remote control unit and said one or more laser sky cannons, and
wherein said remote control unit controls each of said one or more laser sky cannons by sending commands through said communication network.

* * * * *

UNITED STATES PATENT AND TRADEMARK OFFICE
CERTIFICATE OF CORRECTION

PATENT NO.         : 10,041,642 B2
APPLICATION NO.    : 15/425691
DATED              : August 7, 2018
INVENTOR(S)        : Timothy Lee Anderson and Tamas Kovacs Page 1 of 1

It is certified that error appears in the above-identified patent and that said Letters Patent is hereby corrected as shown below:

On the Title Page

In the Abstract, Line 9:
Change: "allow the devices to change theft orientation" to --allow the devices to change their orientation--.

Signed and Sealed this
Twenty-fifth Day of September, 2018

Andrei Iancu
*Director of the United States Patent and Trademark Office*